Feb. 16, 1943.    W. A. SEMERAK    2,311,477
INSIDE MICROMETER
Filed March 10, 1942
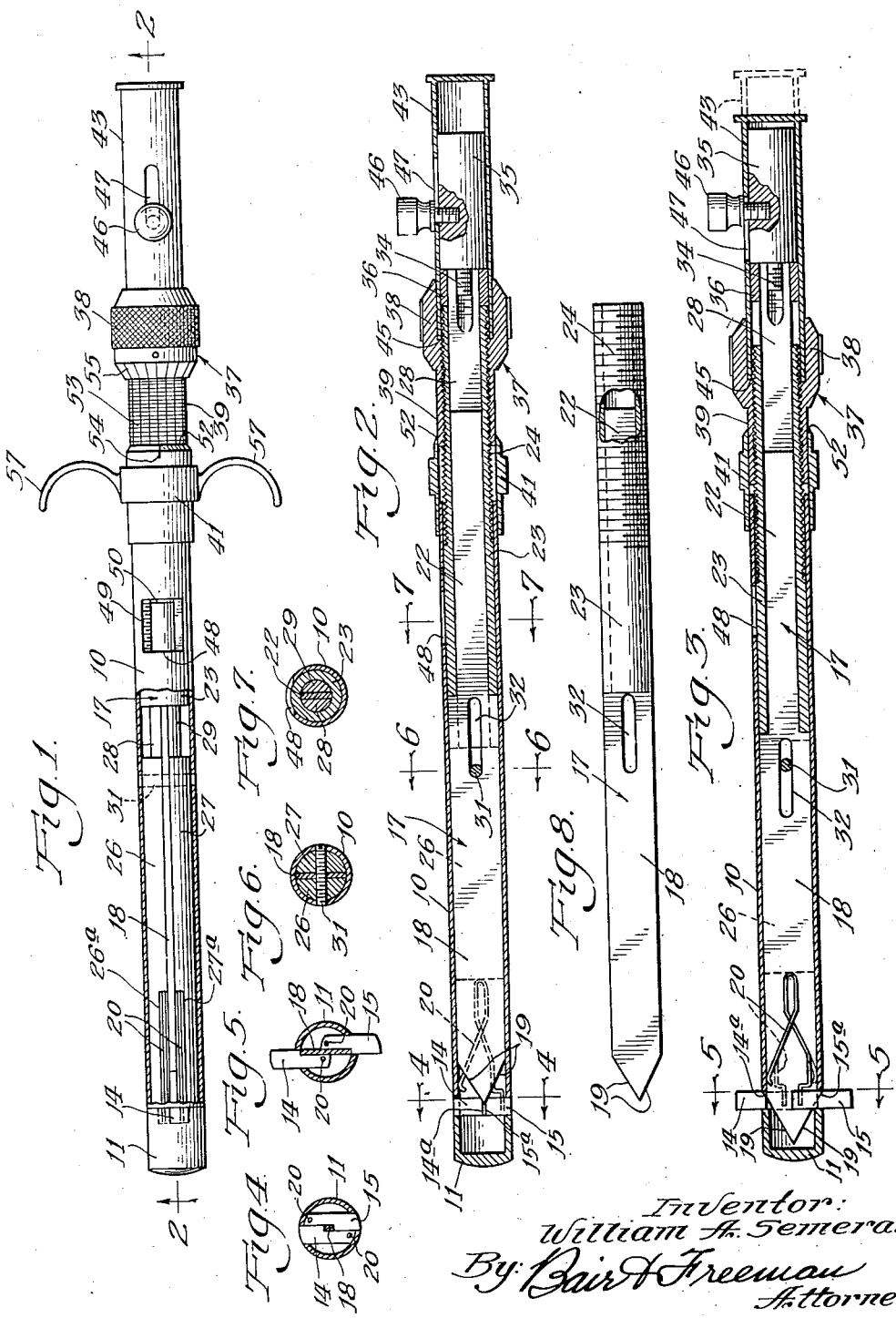

Patented Feb. 16, 1943

2,311,477

UNITED STATES PATENT OFFICE 2,311,477

INSIDE MICROMETER

William A. Semerak, Chicago, Ill.

Application March 10, 1942, Serial No. 434,081

7 Claims. (Cl. 33—143)

The present invention relates to improvements in instruments of the type for accurately measuring parts of an object, and more particularly to internal micrometers for measuring the internal diameter of tubes, bores and, in general, the sizes of cavities formed in various objects.

The micrometer embodyig the present invention is of such construction and arrangement that it lends itself for use in accurately measuring the internal diameters of a relatively small bores, such as the bore of a gun barrel, and which is of such design as to enable the taking of measurement of such bores at a number of axially spaced planes in the bore.

It is recognized that various attempts have been made to devise a micrometer for such use, and, to my present knowledge, there are not now available suitable internal micrometers for measuring small bores of the range of, say, one-half inch in diameter to one inch in diameter.

One practice which has been followed in connection with measuring small diameter bores, of substantial length, consists in using a special form of calipers or other objects for insertion within the bore to be measured, and then utilizing an outside micrometer for measuring the portion of the calipers or such other objects employed for obtaining the diameter of the bore. Obviously, this is not only time-consuming, but also increases the possibility of error and inaccuracy in determining measurements.

One of the objects of this invention is to provide a novel and improved micrometer of the character indicated, which is constructed and arranged in a manner so as to permit convenient use in measuring relatively small diameter bores and cavities of objects.

Another object is to provide a novel and improved micrometer of the character indicated which is constructed and arranged to permit convenient use in measuring relatively small diameter bores and cavities at a plurality of planes located a substantial distance from the end of the bore.

A further object is to provide an improved micrometer of novel construction and arrangement which permits rapid manipulation of parts to obtain instant, approximate measurement of parts of an object.

Still another object is to provide an improved micrometer construction which permits of rapid manipulation of parts to obtain instant, approximate measurement of parts of an object, and which, in addition, is also provided with manually adjustable means to permit obtaining relatively exact measurement of said parts of an object.

A still further object is to provide an improved internal micrometer which is of sturdy construction, capable of quick manipulation for instantaneous reading, and which is capable of being economically manufactured.

Other objects and advantages of this invention will be apparent from the following description taken in connection with the accompanying drawing, in which:

Fig. 1 is a side elevational view of the micrometer embodying the present invention, with parts of the body broken away to show internal construction;

Figure 2 is an axial sectional view through the micrometer, taken substantially as indicated at line 2—2 on Figure 1;

Figure 3 is a sectional view similar to Figure 2, but showing the parts in a position of adjustment corresponding to measurement of a bore;

Figure 4 is a transverse sectional view through the end of the body, showing the measuring pins in retracted position, and taken substantially as indicated at line 4—4 on Figure 2;

Figure 5 is a sectional view, similar to Figure 4, showing the measuring pins in projected position, and taken substantially as indicated at line 5—5 on Figure 3;

Figures 6 and 7 are transverse sectional views through the body, taken substantially as indicated at lines 6—6 and 7—7, respectively, on Figure 2, and Figure 8 is a detail view in side elevation of the main operating element which controls the movement of the measuring pins.

In the construction illustrated in the drawing, the micrometer includes a stationary, tubular body 10, the outer end of which is provided with a head 11 constituting a continuation of said body and serving as a closure for the end thereof. Disposed for slidable guidance in slots formed in the diametrically opposite walls of said head is a pair of cooperating measuring pins 14 and 15, adapted to be projected transaxially of the body, as seen in Figure 3 of the drawing, for engagement with the internal surface of a bore to be measured.

Mounted telescopically within the body 10 for axial movement therein, is a main operating member 17, which includes a flat, bladelike member 18, the forward end of which is tapered to provide two wedge surfaces, as indicated at 19, disposed as a relatively acute angle to each other.

The tapered wedge surfaces 19 are adapted to engage shoulders 14a and 15a formed on the respective measuring pins, so that upon forward movement of the element 17, the tapered surfaces 19 wedge the measuring pins 14 and 15 in an outward direction, projecting in diametrically opposite relation from the body 10.

The measuring pins are normally urged to retracted position within the tubular body, as seen in Figure 2, by individual springs, as indicated at 20. Said springs are formed as bow springs, each having one end anchored in the innermost end of one of the measuring pins, and with the free end thereof positioned against the opposite portion of the wall of the body 10, as seen in Figure 3 of the drawing.

It is to be understood that as the member 18 is moved forwardly to cause its wedge surfaces 19 to project the measuring pins outwardly of the body 10, such movement of the pins is against the reaction of the bow springs 20, so that when the pressure is relieved on the pins incident to the rearward movement of said member 18, the pins are retracted within the body 10 by means of said springs 20.

The bladelike portion 18 of the main operating element 17 includes an extension 22 of reduced width fitted snugly within the bore of a tubular member 23, which is rigidly connected to the bladelike element 18 in any convenient manner, such as by brazing. The external rearward portion of the tubular element 23 is externally threaded, as indicated at 24 in Figure 8 of the drawing. The main operating element 17, including blade 18 and tubular element 23, is slidably guided for axial telescopic movement within the body 10, and for this purpose there is provided a pair of spaced apart, longitudinally extending guide elements 26 and 27, as clearly seen in Figures 1, 6 and 7 of the drawing, which are formed to the contour of the inner wall of the tubular body 10. Said guide elements are spaced apart to form a longitudinal, central slot for accommodating the bladelike member 18 therebetween, and the forward ends of said guide elements, on the inner side thereof, are notched at 26a and 27a, respectively, for accommodating the bow springs 20. The guide members 26 and 27 are rigidly anchored at their forward end in the head 11, on the end of the body, and said guide members are of substantial length, having their rearward portions, as indicated at 28 and 29, respectively, of reduced cross sectional dimension for a telescopic sliding fit within the tubular portion 23 of the main operating element, on opposite sides of extension 22, and terminating a short distance beyond the end of said tubular element 23, as seen in the drawing.

The guide members 26 and 27 are firmly secured to the body 10 by a headless screw 31, threaded through the outer walls of the body 10 and the guide members 26 and 27, as seen in Figure 6 of the drawing, said screw extending through an elongated slot 32 formed in the bladelike element 18 of the main operating element 17. Said screw 31 and the slot 32 are so arranged as to limit axial telescopic movement of the main operating element 17, in a rearward direction, as seen in Figure 2 of the drawing, so as to dispose the wedge operating surfaces 18 of the knifelike blade in a position at which the measuring pins 14 and 15 are permitted to be retracted, with their operating ends disposed flush with the external surface of said body 10, as seen in Figure 2. The spaced apart rear end terminal portions of the guide members 28 and 29 are internally threaded to receive a threaded stud 34, formed on the end of a cylindrical plug 35, which abuts against the ends of said guide member portions 28, 29. Surrounding the ends of the guide members 28 and 29 is a sleeve 36 which serves to confine the terminal portions of said guide members in proper relation for threaded engagement with the stud 34.

Threaded on the rearward threaded portion 24 of the tubular member 23 of the main operating element 17, is a manually rotatable sleeve 37, including a knurled body portion 38 and a forwardly extending tubular portion 39 adapted to be telescoped into the adjacent end of a fitting 41 which is rigidly secured on the rear end of the tubular body 10.

Enclosing the plug 35 is a sleeve cap 43, closed at the rear end, as may be seen in the drawing, and having its forward end normally abutting against a shoulder 45, in a recess formed in the rear end of the knurled body portion 38 of the sleeve 37. Said sleeve cap is confined on the plug 35 by a set screw 46 extending through a slot 47 formed in the wall of the sleeve cap and engaged in the plug 35. The slot 47 thus limits rearward telescopic axial movement of the sleeve cap relatively to the plug 35.

It will now be seen, from the drawing and in view of the foregoing description, that the plug 35 together with the guide members 26, 27, the head 11 and the body 10 with its fixture 41, are thus connected together in a manner to form a unitary, stationary structure.

The body 10 forwardly of the fixture 41 is formed with an elongated window 48, one edge of which is beveled and provided with a graduated scale, as indicated at 49, with which is adapted to register, through said window 48, an index character or feature, as indicated at 50, provided on the tubular sleeve 23 of the main operating element 17. The rear end of the fixture 41 terminates in a beveled surface to form a relatively sharp edge, as indicated at 52, to constitute an index character or feature with which cooperates a graduated scale as indicated at 53, formed on the tubular portion 39 of the manually operable sleeve 37. As seen in the drawing, said scale 53 includes a series of both circumferential and linear graduations. The forward portion of the knurled body 38 of said sleeve 37 is beveled and is provided with a graduated scale 55, which graduations register with and are continuations of the linear graduations of the graduated scale 53, and are adapted to be aligned with the longitudinal index feature 54 formed on the rear end of the fixture 41.

It is to be understood that graduated scales and the index features are correlated to each other, with the scale indicated at 53 having its axially spaced circumferential graduations corresponding to the spacing of the graduated scale 49.

The fixture 41 is provided with a pair of oppositely extending finger grip elements 57 which, together with the end of the cap sleeve 43, provide a suitable hand grip for conveniently disposing and manipulating the instrument in a bore or cavity to be measured.

In operation, the head end of the body is inserted into the bore to be measured, and pressure is exerted against the end of the sleeve cap 43, which causes axial movement of the manually operable sleeve 37 and main operating element 17 upon which said sleeve is threaded, so as to cause the wedge surfaces 19 to project the measuring pins 14 and 15 into engagement with the walls of the bore. If desired, a rough or approximate measurement may be instantly made by observing the relationship of the index feature 50 with respect to the graduated scale 49. If it is desired to obtain a relatively exact measurement, this is attained by rotating the sleeve 37. Desirably, preparatory to taking such measurement, the sleeve 37 is adjusted with its zero graduation in alignment with the index feature 54 on the rear end of the fixture 41.

It is to be understood that when the index feature 50 is in registration with a graduation of the scale 49, then a circumferential graduation of the scale 53 will at the same time align with the index feature 52, which is the knife edge at the rear end of the fixture 41. If, for example, we assume that the graduations of the scale 49 are spaced apart amounts equivalent to $25/1000$ of an inch, then the circumferential graduations of the scale 53 are spaced a similar distance apart. The linear graduations of scale 53 on the extension 39 of the sleeve 37, as well as on the beveled portion of the body 38, are desirably spaced apart to form twenty-five divisions, so that one complete revolution of the manually operable sleeve 37 will advance said sleeve with respect to the index knife edge 52 the distance between two adjacent circumferential graduations; in other words, $25/1000$ of an inch.

It is of course to be understood that the threading connection between the sleeve 37 and the tubular portion 23 of the main operating element 17, is such that one rotation of the sleeve advances it with respect to the tubular portion 23 in an amount equivalent to $25/1000$ of an inch. Thus, when taking an internal measurement, if the index feature 50 happens to align itself intermediate two adjacent graduations of the scale 49, then the index feature 52 will likewise register intermediate two adjacent transverse graduations of the scale 53. Then, by rotating the sleeve 37 until the next adjacent circumferential graduation aligns with the index feature 52 on the end of the fixture 41, a reading may be made of the graduated scale 55 of the linear graduation aligned with index feature 54. It will then be necessary to either add or subtract the reading of scale 55 from the reading made on the graduated scale 49, depending upon the particular direction of rotation of the sleeve 37 in order to bring the next adjacent circumferential graduation scale 53 in registration with the sharp edge index feature 52.

It has been found desirable, in the use of this instrument, to releasably secure the tubular body 10 and the telescopically movable main operating element 17 in the position in which said parts are adjusted in the performance of the measuring operation wherein the measuring pins 14 and 15 are in engagement with the walls of the bore, by manipulation as above described. For this purpose, the set screw 46 may be tightened, so as to permit removal of the instrument from the bore, and then, by observing the relation of the index feature 50 with respect to the graduated scale 49, and after determining whether or not it is necessary to make further calibration by rotation of the sleeve 37, then make either a proper addition or subtraction of the reading made on the scale 49 in a manner as above indicated.

It will now be manifest that my novel and improved form of micrometer lends itself to obtaining quick and easy calibrations or measurements of bores or internal cavities of objects. If desired, the main operating sleeve 37 may be mounted on the tubular portion 23 of the main operating element 17 in a manner so as to limit its rotation thereon to one complete single revolution. Any suitable construction and arrangement may be provided for this purpose, if desired, in order to insure having a starting and stopping point for rotation of said sleeve with respect to the index feature 54 on the end of the fixture 41 associated with the body 10.

It is to be understood that, broadly, my novel construction and arrangement, by virtue of which rapid calibration may be obtained, is not limited to embodiment in an internal micrometer, as it is apparent that the general construction for accomplishing this result may be conveniently embodied also in an outside micrometer, and accordingly certain of the claims as appended hereto are to be accorded such broad interpretation.

While I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited in the appended claims.

I claim as my invention:

1. In a micrometer, a pair of members engageable with an object to be measured, a stationary element, a movable element telescopically associated with the stationary element for free axial movement of said elements relatively to each other, said elements being provided with cooperating graduated scale and index features, and said movable element being operatively connected to one of said members, whereby said movable element may be quickly and freely shifted axially relatively to the stationary element for causing said members to engage the part of the object to be measured, and thereby instantly obtain a rough calibration of the part of said object, and a calibrated sleeve mounted for threaded rotation on and movable with said movable element, index means at the rear end of the stationary element, cooperating with said calibrated sleeve, whereby said calibrated sleeve and index means together with the aforesaid scale and index features permits obtaining relatively exact calibration of the part of the object being measured.

2. In a micrometer, a pair of members engageable with an object to be measured, a stationary element, a movable element telescopically associated with the stationary element for free axial movement of said elements relatively to each other, said elements being provided with cooperating graduated scale and index features, and said movable element being operatively connected to one of said members, whereby said movable element may be quickly and freely shifted axially relatively to the stationary element for causing said members to engage the part of the object to be measured, and thereby instantly obtain a rough calibration of the part of said object, a calibrated sleeve mounted for threaded rotation on and movable with said movable element, index means at the rear end of the stationary element, cooperating with said calibrated sleeve, whereby said calibrated sleeve and index means together with the aforesaid scale and index features permits obtaining relatively exact calibration of the part of the object being measured, and means for releasably securing said elements in a fixed relative position of axial adjustment incident to measuring of said object, to permit subsequent manipulation of said sleeve, independently of the presence or absence of the object, to obtain said relatively exact calibration of said part of the object.

3. In a micrometer for measuring the interior of an object, a stationary tubular body, a movable element mounted for telescopic movement in said body, a pair of members carried in one end of the body and engageable with an object to be measured, one of said members being movable relatively to the other in transaxial relation to said body, said movable element being operatively connected to said movable member, said body having an elongated window, the portion of said body adjacent said window, and the portion of said movable element adapted to be registered with said window, being provided with cooperating graduated scale and index features, whereby said movable element may be quickly and freely shifted axially in said body for causing said members to engage the part of the object being measured, and thereby instantly obtain a rough calibration of said part of said object, and a sleeve mounted for threaded rotation on the rear end portion of said movable element and having a portion disposed in telescopic relation to the rear end of said body, the adjacent portions of said sleeve and the body being provided with cooperating graduated scale and index features, which together with the aforesaid scale and index features permits obtaining relatively exact calibration of said part of said object.

4. In a micrometer for measuring the interior of an object, a stationary tubular body, a movable element mounted for telescopic movement in said body, a pair of members carried in one end of the body and engageable with an object to be measured, one of said members being movable relatively to the other in transaxial relation to said body, said movable element being operatively connected to said movable member, said body having an elongated window, the portion of said body adjacent said window, and the portion of said movable element adapted to be registered with said window, being provided with cooperating graduated scale and index features, whereby said movable element may be quickly and freely shifted axially in said body for causing said members to engage the part of the object being measured, and thereby instantly obtain a rough calibration of said part of said object, a sleeve mounted for threaded rotation on the rear end portion of said movable element and having a portion disposed in telescopic relation to the rear end of said body, the adjacent portions of said sleeve and the body being provided with cooperating graduated scale and index features, which together with the aforesaid scale and index features permits obtaining relatively exact calibration of said part of said object, and means for releasably securing said body and movable element fixedly together at any desired relative axial position.

5. In a micrometer for measuring the interior of an object, a stationary tubular body, a movable element mounted for telescopic movement in said body, the rear end portion of the movable element being of tubular form, said body including a head at one end, elongated means connected to the interior of the head and extending through said tubular portion of said movable element for guiding the latter during its telescopic movement in said body, a pair of members carried in one end of the body and engageable with an object to be measured, one of said members being movable relatively to the other in transaxial relation to said body, said movable element being operatively connected to said movable member, said body having an elongated window, the portion of said body adjacent said window, and the portion of said movable element adapted to be registered with said window, being provided with cooperating graduated scale and index features, whereby said movable element may be quickly and freely shifted axially in said body for causing said members to engage the part of the object being measured, and thereby instantly obtain a rough calibration of said part of said object, and a sleeve mounted for threaded rotation on the rear end portion of said movable element and having a portion disposed in telescopic relation to the rear end of said body, the adjacent portions of said sleeve and the body being provided with cooperating graduated scale and index features, which together with the aforesaid scale and index features permits obtaining relatively exact calibration of said part of said object.

6. In a micrometer for measuring the interior of an object, a stationary tubular body, a movable element mounted for telescopic movement in said body, the rear end portion of the movable element being of tubular form, said body including a head at one end, elongated means connected to the interior of the head and extending through said tubular portion of said movable element for guiding the latter during its telescopic movement in said body, a pair of members carried in one end of the body and engageable with an object to be measured, one of said members being movable relatively to the other in transaxial relation to said body, said movable element being operatively connected to said movable member, the rear end of said elongated guide means, projecting beyond the rear end of the movable element, terminating in an enlarged guide, a sleeve mounted for threaded rotation on the rear end portion of said movable element, and a sleeve cap slidably mounted for axial movement on said enlarged guide and having one end abutting the threaded sleeve, whereby axial movement of said sleeve cap imparts axial movement to said element for shifting said movable member in an outwardly direction, said body having an elongated window, the portion of said body adjacent said window, and the portion of said movable element adapted to be registered with said window, being provided with cooperating graduated scale and index features, whereby said movable element may be quickly and freely shifted axially in said body for causing said members to engage the part of the object being measured, and thereby instantly obtain a rough calibration of said part of said object, said sleeve having a portion disposed in telescopic relation to the rear end of said body, the adjacent portions of said sleeve and the body being provided with cooperating graduated scale and index features, which together with the aforesaid scale and index features permits obtaining relatively exact calibration of said part of said object.

7. In a micrometer for measuring the interior of an object, a stationary tubular body, a movable element mounted for telescopic movement in said body, the rear end portion of the movable element being of tubular form, said body including a head at one end, elongated means connected to the interior of the head and extending through said tubular portion of said movable element for guiding the latter during its telescopic movement in said body, a pair of members carried in one end of the body and engageable with an object to be measured, one of said members being movable relatively to the other in transaxial relation to said body, said movable element being operatively connected to said movable member, the rear end of said elongated guide means, projecting beyond the rear end of the movable element, terminating in an enlarged guide, a sleeve mounted for threaded rotation on the rear end portion of said movable element, a sleeve cap slidably mounted for axial movement on said enlarged guide and having one end abutting the threaded sleeve, whereby axial movement of said sleeve cap imparts axial movement to said element for shifting said movable member in an outwardly direction, said body having an elongated window, the portion of said body adjacent said window, and the portion of said movable element adapted to be registered with said window, being provided with cooperating graduated scale and index features, whereby said movable element may be quickly and freely shifted axially in said body for causing said members to engage the part of the object being measured, and thereby instantly obtain a rough calibration of said part of said object, said sleeve having a portion disposed in telescopic relation to the rear end of said body, the adjacent portions of said sleeve and the body being provided with cooperating graduated scale and index features, which together with the aforesaid scale and index features permits obtaining relatively exact calibration of said part of said object, and means for releasably securing said cap sleeve to the enlarged guide for holding the body and movable element in fixed relation to each other.

WILLIAM A. SEMERAK.